United States Patent Office 2,764,924
Patented Oct. 2, 1956

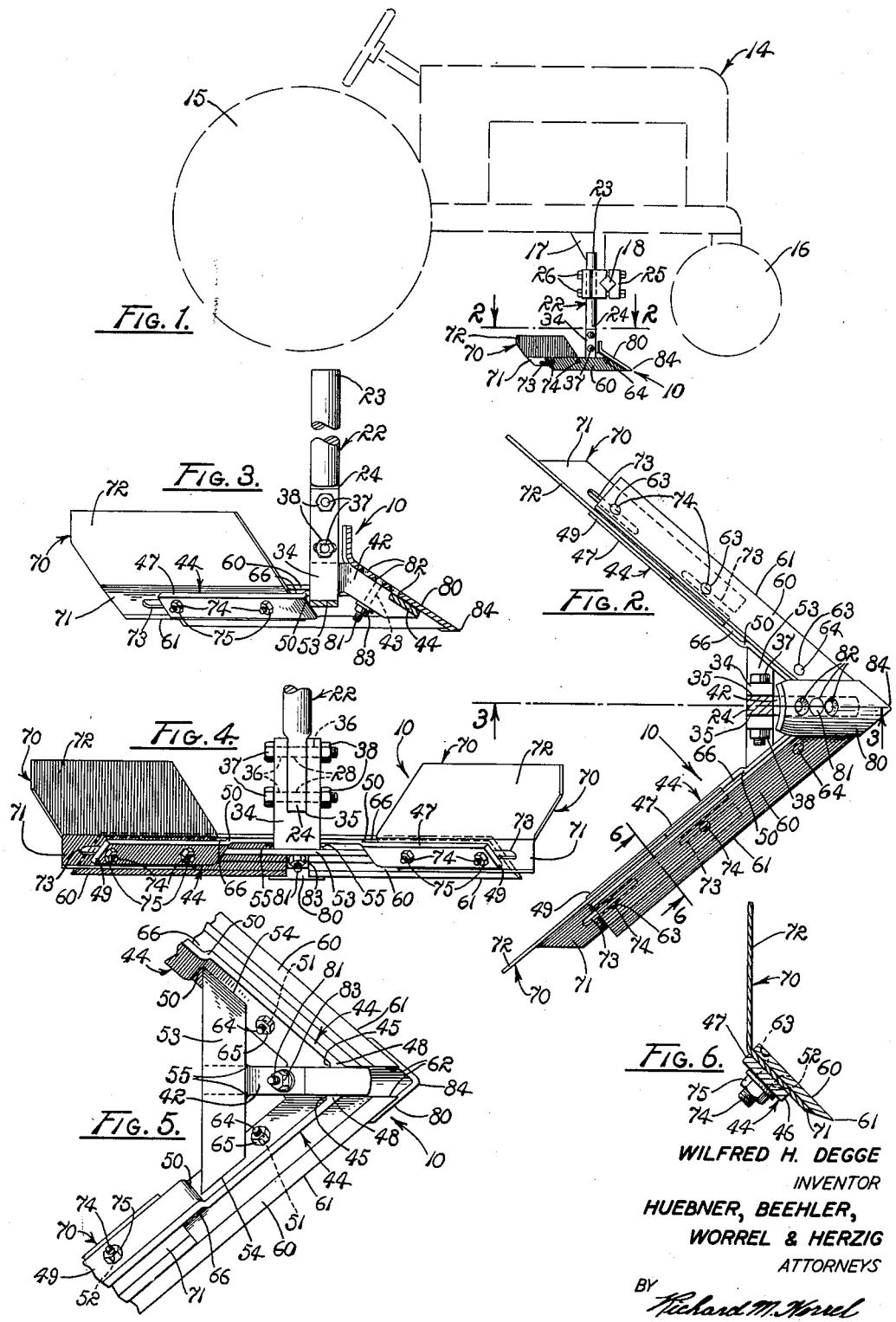

2,764,924

FURROWING SWEEP

Wilfred H. Degge, Tipton, Calif.

Application April 27, 1953, Serial No. 351,332

5 Claims. (Cl. 97—205)

The present invention relates to earth working tools and more particularly to an adjustable furrowing sweep.

In the irrigation of farm lands, it has long been the practice to form furrows or ditches through which water is directed for irrigating purposes. The furrows are usually formed by drawing furrowing shovels or plows through the earth along a path in which it is desired to direct water. Such shovels usually provide ditches having downwardly convergent sides. While such ditches are generally dependable in confining irrigating water to desired paths of movement, they are not conducive to the optimum water penetration of the soil. It has subsequently been discovered that furrows having substantially flat bottoms over which water can be flowed in substantially uniform depth are vastly superior in heavy soils and many furrowing shovels have been developed for the purpose. Such shovels which are adapted to form furrows having substantially flat bottoms have become known as sweeps because of their opposite sweeping of encountered earth during furrow formation.

It has more recently been discovered, that while substantially flat bottom furrows are superior to narrow furrows having acutely related downwardly convergent sides, that it is sometimes desirable, particularly in sandy or other soil easily penetrable by water, somewhat to slope the bottom of the furrow toward a longitudinal center line thereof. Such sloping is preferably adjustable so as to accommodate varied soil requirements.

In addition, it is desirable to be able to adjust such furrowing sweeps so as to modify the widths of the furrows formed thereby. For example, in the raising of cotton or other row crops it is usually necessary during successive furrowing operations as the cotton or other plants increase in size, progressively to modify the furrow widths as irrigation considerations and the increased plant sizes require. Heretofore, the variation in furrow size has been accomplished by substituting furrowing shovels of differing characteristics for those previously employed. This has been a time consuming and expensive operation that has proved not fully satisfactory in the results attained.

An object of the present invention is, therefore, to provide an adjustable furrowing sweep which is easily modified to accomplish a wider range of furrowing functions.

Another object is to provide a furrowing sweep of adjustable width suitable for forming substantially flat bottom ditches and the like.

Another object is to provide a furrowing sweep of the character described which is easily adjustable to form furrows having substantially flat bottoms or bottoms downwardly sloped in adjusted degrees of inclination toward a longitudinal center line.

Other objects and advantages are to provide improved elements and arrangements thereof in a device of the character and for the purposes set forth that is economical to produce, durable in structure, conveniently adjustable, and fully effective in the formation of a wide variety of furrows.

Further objects and advantages will become apparent in the subsequent description in the specification.

Referring to the drawing:

Fig. 1 is a side elevation of the furrowing sweep of the instant invention mounted on a tractor, the tractor being shown in dashed lines.

Fig. 2 is a plan view of the furrowing sweep, as viewed from line 2—2 in Fig. 1 through a shank of the sweep.

Fig. 3 is a vertical longitudinal section through the furrowing sweep, taken along line 3—3 of Fig. 2 and having a portion of the shank removed for illustrative convenience.

Fig. 4 is a rear elevation of the sweep with the shank of the shovel shown fragmentarily.

Fig. 5 is a slightly enlarged fragmentary bottom view of the sweep showing the forward end portion of the furrowing sweep.

Fig. 6 is a further enlarged vertical section taken on line 6—6 in Fig. 2.

Referring in greater detail to the drawing:

The furrowing sweep of the instant invention is indicated generally by the reference numeral 10 and is adapted to be mounted on a prime mover 14 whereby it may be moved forwardly for furrow formation. The prime mover conveniently takes the form of a tractor having rear traction wheels 15, and steerable front wheels 16, which is adapted to carry the furrowing sweep in forwardly disposed earth traversing movement. The tractor is provided with a bracket 17 on which is mounted a substantially horizontal tool bar 18 transversely of the direction of movement of the tractor between its front wheels 16 and rear wheels 15. The tool bar is mounted for adjustable elevational movement by any suitable means, not shown. Any desired number of furrowing sweeps are mounted in forwardly disposed position on the tool bar. When a plurality of shovels are employed, they are located in spaced relation along the bar.

Each furrowing sweep is provided with an elongated substantially erect shank having an upper end 23 and a lower end 24. The upper end of the shank is secured to the tool bar by means of a clamping block 25 or other suitable means. Bolts 26 on each clamping block tighten the block to both the tool bar and the shank. The lower end 24 of the shank is flattened and has a pair of vertically spaced bores 28 drilled horizontally therethrough.

An auxiliary shank 34 having a rectangular recess 35 formed inwardly of one end thereof dimensioned to receive the flattened lower end of the shank is fitted upwardly over the lower end of the shank. A pair of bores 36 are formed through the recessed portion of the auxiliary shank in alignment with the bores 28. One of the bores 36 is preferably of kidney shape and of a curvature concentric to the opposite bore. Bolts 37 are passed through the bores 28 and 36 secured by nuts 38 screw-threadably mounted thereon.

The lower end of the auxiliary shank is extended obliquely forwardly and downwardly in the form of a foot 42 having a bore 43 drilled therethrough. A pair of elongated rectangular mounting arms 44 are rigidly attached, as by welding, to each side of the foot and project substantially horizontally rearwardly divergently therefrom. Each mounting arm is substantially rectangular and provides an inner edge 46, an outer edge 47, a forward end portion 48 and a rearward end portion 49. The mounting arms are preferably welded to the foot 42 of the auxiliary shank 34 so that they extend outwardly and rearwardly from the foot at an angle of about 50 degrees relative to direction of intended movement of the sweep. The arms are transversely rearwardly inclined at about a 45 degree angle. The rearward end portions 49 of the arms are inwardly offset at 50 from their respective forward end portions 48 and disposed in substantially parallel relation to their respective forward end portions. An opening 51 is formed through the forward end portion 48 of each mounting arm and a plurality of openings 52 formed through the rearward end portion 49 of each mounting arm. The openings 51 and 52 are in substantial alignment longitudinally of their arms.

Rigid interconnection of the arms 44 and the auxiliary shank 34 is maintained by a cross bar or strut 53 welded at its ends at 54 to the inner faces of the mounting bars and welded at 55 midway of its length to the lower end of the auxiliary shank.

A pair of elongated substantially rectangular shear blades 60 are positioned forwardly against the forward portions 48 of the arms and are rearwardly substantially horizontally extended in parallel spaced relation to the rearward end portions 49 of their respective arms. Each blade is transversely inclined from a sharpened forward edge 61 and provided with an angular forward end 62 fitted against the foot 42. A plurality of openings 63 are formed through each shear blade in alignment with the openings 51 and 52 through the mounting bars. A bolt 64 is passed through each of the forwardmost of the openings 63, through the opening 51 aligned therewith and secured by a nut 65. The offset on each of the mounting bars provides a space 66 between each shear bar and the offset portion of its mounting bar.

A rectangular, transversely angular wing 70 having a substantially rectangular mounting panel 71 and substantially rectangular mold-board panel 72 is mounted on the rearward end portion 49 of each arm 44 and longitudinally rearwardly extended therefrom. The mounting panel is fitted into the space 66 between its respective arm 44 and blade 60 mounted in overlaying spaced relation thereto. Elongated slots 73 are provided longitudinally in each of the mounting panels 71 in positions alignable with the openings 52 and 63. Bolts 74 having heads countersunk in the blades 60 are extended downwardly through the openings 63, slots 73, and openings 52 and have nuts 75 screw-threadably mounted thereon. The nuts are tightened on their bolts to compress the blades 60 and arms 44 in clamping relation to the mounting panels 71 of the wings 70 slidably extended therebetween dependably to locate the wings in adjusted position.

A shovel, or pilot shoe 80 is mounted against the forwardly disposed edge of the auxiliary shank 34 by a bolt 81 extended through one of a plurality of openings 82 formed in the shoe and through the bore 43 in the foot 42. The bolt has a countersunk head and a nut 83 is mounted on the lower end whereby the shovel is tightened into position against the forward edge of the auxiliary shank in overlaying relation to the forward ends of the blades 60. It will be observed that the shovel has a forwardly disposed digging end 84 from which it is rearwardly inclined.

*Operation*

The operation and utility of the present invention are believed to be clearly apparent and are briefly summarized at this point. Any desired number of furrowing sweeps 10 are mounted on the tool bar 18, or other suitable mounting means, for earth traversing movement with the tractor 14. As the tractor is motivated in a forward direction, the furrowing sweeps are lowered into earth engagement. The shovel 80 of each furrowing sweep acts as a pilot in earth engagement and the blades urge earth divided by the shovel laterally of the direction of earth traversing movement to form a substantially flat bottom furrow. When it is desired to form a narrow furrow, the nuts 75 are loosened, the wings 70 thrust inwardly of the spaces 66, and the nuts retightened to clamp the wings in adjusted position.

With the auxiliary shank 34 in substantial alignment with the shank 22, the form of the invention shown in the drawing forms a shallow furrow whose depth is dependent upon the elevation at which the sweep is supported by the tractor. When it is desired to form a furrow having a bottom sloped inwardly to a longitudinal center line, the nuts 38 are loosened, and the shovel 80 tilted downwardly so that the arms 44, blades 60, and wings 70 are somewhat upwardly rearwardly extended after which the nuts are again tightened to hold the auxiliary shank in adjusted position on the mounting shank. Conversely, the shovel can be pivoted relatively upwardly from its position shown in Fig. 3, to form furrows whose bottoms are deeper at their marginal edges than along a center line thereof. Such furrow formation imposes severe strain on the blades, arms and wings, however, and is not recommended in hard soils.

To form furrows of increased width, the nuts 83 are loosened and the wings 70 slid outwardly from between the arms 44 and blades 60 to desired position whereupon the nuts are retightened to clamp the wings in adjusted position.

The furrowing sweep of the present invention has been thoroughly tested and found excellently suited to the formation of furrows of various widths and bottom forms. It is economical to produce, convenient to adjust to varied operating requirements and is durable. Obviously, the greatest wear is imposed on the digging end 84 of the shovel 80. The plurality of openings 82 permits the movement of the shovel downwardly as it wears so that a maximum of use can be made thereof.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An adjustable furrowing sweep having a substantially erect shank having forward and rearward edges, a shovel mounted on the forward edge of the shank and forwardly and downwardly extended therefrom, a pair of elongated substantially horizontal arms mounted on the shank and divergently rearwardly extended therefrom, each of the arms having a rearwardly extended offset portion elongated transversely angular wings mounted in forwardly overlaying relation on the offset portions of the arms for adjustable movement longitudinally thereof and transversely upwardly extended therefrom, substantially horizontal elongated blades mounted in forwardly overlaying relation on the arms and wings and being in spaced relation to the offset portions of the arms, and means for compressing the offset portions of the arms and the blades into clamping relation to the wings located therebetween.

2. In a furrowing sweep having a shovel mounted for earth traversing movement in a predetermined direction, the combination of a pair of arms rearwardly substantially horizontally extended divergently from the shovel having rearwardly extended end portions inwardly offset toward their respective opposite arms, from alignment with the forwardly adjacent portions thereof, the forward and rearward portions of each arm being in substantially parallel relation, elongated wings positioned forwardly against the rearwardly extended end portions of the arms for slidable movement longitudinally thereof and rearwardly extended therefrom, elongate blades mounted forwardly against the forward end portions of the arms and rearwardly extended in overlaying relation to the wings, and means releasably compressing the blades and the rearward end portions of the arms in clamping relation to the wings located therebetween.

3. An adjustable furrowing sweep comprising a substantially erect shank having forward and rearward edges; a shovel mounted on the forward edge of the shank having a downwardly and forwardly extended digging end; a pair of arms mounted on the shank rearwardly of the shovel and divergently rearwardly extended therefrom; each of the arms having a rearwardly extended end portion inwardly offset toward the opposite arm in substantially parallel relation to the remainder of the arm; an elongated transversely angular wing having a mounting panel fitted outwardly against the rearwardly extended end portion of each arm having a forwardly disposed face substantially flush with the remainder of its respective arm and a mold-board panel upwardly extended therefrom, the mounting panels of the wings having elongated slots longitudinally therein; elongated, transversely rearwardly inclined blades mounted on the arms having forward ends extended rearwardly beneath the shovel and rearward ends overlaying the mounting panels of the wings; and releasable bolts extended through the blades, the slots of the wings and the extended portions of the arms compressing the blades and extended portions of the arms into clamping relation to the wings.

4. An adjustable furrowing sweep comprising a shank adapted for mounting in a substantially erect position in a support vehicle, an auxiliary shank mounted on the shank for pivotal movement about a substantially horizontal axis and obliquely downwardly extended therefrom, a shovel mounted on the auxiliary shank having an extended digging end and being inclined toward the shank, a pair of elongated substantially flat arms rigidly mounted on the auxiliary shank beneath the shovel and divergently extended substantially horizontally therefrom at opposite sides of the shank, each arm having a transversely disposed lower edge extended away from the shank and being transversely inclined therefrom toward the shank, each arm also having a longitudinally adjacent mounting portion and an extended portion offset downwardly and toward the opposite arm from alignment with its respective mounting portion and disposed in substantially parallel relation to its mounting portion, elongated transversely angular wings having mounting panels slidably positioned flatly upon the rearward portions of the arms and mold-board panels upwardly extended from the mounting panels, the mounting panels having elongated slots longitudinally therein, elongated substantially rectangular blades positioned flatly upon the mounting panels of the wings of their respective arms having sharpened transversely downwardly disposed lower edges, means rigidly mounting the blades on the mounting portions of their respective arms in positions extended over the mounting panels of their respective wings, and releasable securing bolts extended through the blades, the slots of the wings and the extended portions of the arms compressing the blades and extended portions of the arms into clamping relation to the wings.

5. An adjustable furrowing sweep having a substantially erect shank having forward and rearward edges, a shovel mounted on the forward edge of the shank and forwardly and downwardly extended therefrom, a pair of elongated substantially horizontal arms mounted on the shank and divergently rearwardly extended therefrom, each of the arms having a rearwardly extended offset portion, elongated wings mounted in forwardly overlaying relation on the offset portions of the arms for adjustable movement longitudinally thereof and upwardly extended therefrom, substantially horizontal elongated blades mounted in forwardly overlaying relation on the arms and wings and being in spaced relation to the offset portions of the arms, and means for compressing the offset portions of the arms and the blades into clamping relation to the wings located therebetween.

References Cited in the file of this patent

UNITED STATES PATENTS

| 1,483,776 | Cadenhead | Feb. 12, 1924 |
| 1,580,405 | Brown | Apr. 13, 1926 |
| 1,632,958 | Frieburg | June 21, 1927 |
| 1,769,545 | Pence | July 1, 1930 |
| 1,800,152 | Phillips et al. | Apr. 7, 1931 |
| 2,061,472 | Leggett | Nov. 17, 1936 |
| 2,094,424 | Cole | Sept. 28, 1937 |
| 2,641,071 | Brown | June 9, 1953 |